Patented Oct. 21, 1947

2,429,404

UNITED STATES PATENT OFFICE 2,429,404

MEDICINAL PREPARATIONS CONTAINING SULFONAMIDES

James Kenneth Dixon, Riverside, and Russell L. Morgan, Noroton, Conn., assignors to American Cyanamid Company, New York, N. Y., a corporation of Maine No Drawing. Application December 30, 1942, Serial No. 470,634

3 Claims. (Cl. 167—51.5)

This invention relates to medicinal preparations and has for its object the provision of an improved medicinal preparation containing a sulfonamide. More particularly, the invention relates to the provision of a medicinal preparation comprising a sulfonamide, an alkylolamine and a water soluble cellulose derivative. One form of the preparation is particularly well suited for the treatment of burns since it possesses a number of desirable properties which will be described hereinafter. The preparations in general, however, are efficacious for the treatment of a wide range of infectious ailments, in addition to burns. For example, the preparations may be used externally for the treatment of superficial injuries, irrigation of wounds and as a spray for combating nasal infections.

It has recently been shown that many sulfonamide compounds have a definite and extremely desirable bacteriostatic action when applied externally to wounds, burns and the like. In the Bulletin Johns Hopkins Hospital 69:217, 1941, a new treatment for burns was described which utilized a medicinal preparation comprising an aqueous 2-sulfanilamidopyrimidine solution in triethanolamine. The above aqueous 2-sulfanilamidopyrimidine-triethanolamine solution has been very widely used for the treatment of burns or similar wounds wherein an infection is extremely likely to develop. While the 2-sulfanilamidopyrimidine-triethanolamine solution was particularly useful for the treatment of burned patients, it was not entirely satisfactory from a number of viewpoints. Without detracting from the merits of 2-sulfanilamidopyrimidine-triethanolamine solution, it was found that the preparation was difficult to apply in some instances, particularly where the area to be treated was relatively large, such as is the case in many burned patients. In such applications the 2-sulfanilamidopyrimidine-triethanolamine solution was required to be sprayed on or applied a number of times before a protective film or eschar was formed. In some instances approximately 3 days of intermittent spraying with the 2-sulfanilamidopyrimidine-triethanolamine solution was required for eschar formation. Even after the eschar had been formed it was weak and was frequently disrupted or broken away by the weeping fluids from the burned areas. In the treatment of burns, it is generally conceded that early formation of a sterile eschar is of primary importance. It is seen, therefore, that the 2-sulfanilamidopyrimidine-triethanolamine solution was deficient in its ability to form a rapid and satisfactory eschar.

In accordance with the present invention we have found that medicinal preparations comprising a sulfonamide, an alkylolamine and a water soluble cellulose derivative can be produced which possesses all of the desirable bacteriostatic action and other properties of the prior sulfonamide preparations plus the extremely desirable property of forming a film or coating over the area being treated in a relatively short time. Our medicinal preparations have the advantage that they can be produced in the form of a liquid suitable for application by spraying or in the form of a solid or semi-solid mass which can be applied by spreading and that in either case, application will result in the production of a relatively tough, pliable, elastic and protective film which will promote rapid healing and inhibit infection. It is also an advantage that the protective film which is formed is water soluble to a very large degree and, while it will remain intact over the applied area, it can readily be removed by treatment with water without any discomfort or injury to the patient.

The manner in which our invention may be practiced will be specifically illustrated by the following description. It should be understood, however, that the invention is not limited to the specific details set forth in the illustrations.

A solution suitable for application by spraying containing 1.3% methyl cellulose (1500 cps.) 2.0% 2-sulfanilamidopyrimidine, 5.3% triethanolamine and the remaining percentage as water is prepared by mixing, until homogeneous at room temperature, an aqueous dispersion of double the desired concentration of methyl cellulose with a solution of double the desired concentration of 2-sulfanilamidopyrimidine and triethanolamine. This preparation, when applied to a burned area by spraying, resulted in the production of an eschar formation after one day. The film or eschar formed was transparent and pervious to additional 2-sulfanilamidopyrimidine-triethanolamine methyl cellulose solution.

A preparation containing 3% 2-sulfanilamidopyrimidine, 8% triethanolamine and 5% methyl cellulose (400 cps.), the remaining percentage being water, resulted in the production of a preparation having a viscosity of about 95 poises. A preparation having a somewhat accelerated film forming action was prepared similar to those described above containing the following ingredients: 3% 2-sulfanilamidopyrimidine, 8% triethanolamine, 5% methyl cellulose (400 cps.), ethyl alcohol 25% and the remaining percentage water. Preparations were prepared using slightly different amounts of methyl cellulose and/or additional solvents, plasticizers, coloring reagents, wetting agents, etc. The compositions of these preparations are summarized in the following table:

[Note.—Water equals percentage not otherwise accounted for.]

| 2-Sulfanil-amidopyrimidine | Triethanol-amine | Methyl Cellulose | Plasticizer | Non Aqueous Solvent | Other Substances |
|---|---|---|---|---|---|
| Per cent | Per cent | | | | |
| 3 | 8 | 2.5% (400 cps.) | | | |
| 3 | 8 | 5% (400 cps.) | | 25% acetone | |
| 3 | 8 | 5% (400 cps.) | 1% glycerine | | |
| 3 | 8 | 2.5% (400 cps.) | | | Very small per cent rhodamine B added to give flesh colored film. |
| 3 | 8 | 2.5% (400 cps.) | | | Small per cent erythosine N added. |
| 3 | 8 | 2.5% (400 cps.) | | 25% alcohol | |
| 3 | 8 | 5% (25 cps.) | | | |
| 3 | 8 | 5% (15 cps.) | | | |
| 1.5 | 4 | 2.5% (400 cps.) | | | 1% salicyl alcohol, .1% sodium benzoate. |
| 10 | 26.5 | 5% (400 cps.) | | | |
| 5 | 13.3 | 5% (400 cps.) | | | |
| 1 | 2.7 | 5% (400 cps.) | | | |
| 1.5 | 4 | 2.5% (400 cps.) | | | |
| 3 | 8 | 5% (1500 cps.) | | | .05% sodium salt of the dioctyl ester of sulfosuccinic acid. |

Because of the availability of a wide range of viscosity types of methyl cellulose, (15 to 4,000 centipoises)., a solution of any reasonable viscosity can be prepared. For example, as illustrated above it was possible to prepare a nearly clear 2-sulfanilamidopyrimidine-triethanolamine solution in 5% methyl cellulose (15 centipoises) which had a viscosity of 5–13 poises. Such solutions can be applied by spraying, if desired. On the other hand, a similar solution in 5% methyl cellulose (400 centipoises) had a viscosity greater than 95 poises and could, consequently, best be applied like an ointment.

Solutions similar to those described above having similar properties can be prepared using diethanolamine instead of triethanolamine and 2-sulfanilamidothiazole, sulfanilamide, 2-sulfanilamidopyridine or other sulfonamides, mixtures of sulfonamides or salts of sulfonamides, instead of 2-sulfanilamidopyrimidine. Various alkylolamines can be used instead of triethanolamine including 2-amino, butanol, 2-amino-2-methyl-1-propanol, 2-amino-2-ethyl 1,3,propanediol, etc.

A solid preparation is prepared by mixing finely ground 2-amino 2-methyl 1,3-propane diol, 2-sulfanilamidopyrimidine and finely ground methyl cellulose (dry) to produce a powdered preparation that can be used directly or that can be readily dispersed in water.

A concentrated ointment having very desirable properties was prepared by mixing a concentrated aqueous methyl cellulose solution with a concentrated 2 - sulfanilamidopyrimidine - triethanolamine water solution. The concentration of this composition was 6.5% methyl cellulose, 10% 2-sulfanilamidopyrimidine, 30% triethanolamine and 53.5 water. This ointment is suitable for direct application as such or, if desired, it can be diluted with approximately 4 parts of water to give a solution which can be sprayed.

In the foregoing specific illustrations, we have preferred to describe our invention utilizing 2-sulfanilamidopyrimidine, since it is our preferred sulfonamide compound. Instead, thereof, we can use any sulfonamide compound having bacteriostatic properties. Typical sulfonamide compounds include sulfanilamide, 2-sulfanilamide, 2-sulfanilamidothiazole, 2-sulfanilamidopyridine, disulfanilamide, the various $N^1$-sulfanilamides such as $N^1$-butyrylsulfanilamide, $N^1$-dodecanolsulfanilamide, as well as the water soluble and water insoluble salts of the above compounds. Of the various salts we prefer to use the sodium. Similarly, methyl cellulose is the preferred water soluble cellulose material for use in the production of our medicinal preparations. We can, however, utilize any of the non-toxic, water soluble cellulose derivatives capable of forming a film. The methyl cellulose ether is preferred because of its being readily available on the market. Instead thereof, however, we can use certain cellulose ethers, cellulose esters and mixed ether-ester or similar water soluble cellulose derivatives. Specific cellulose derivatives are those such as, for example, ethyl cellulose acetate, methyl cellulose propionate, hydroxyethylcellulose butyrate, alkali metal salts of carboxymethyl cellulose or alkali metal salts of cellulose glycolic acid and the ike. The preferred class of cellulose derivatives are the water soluble lower alkyl cellulose derivatives including the methyl cellulose ether, ethyl cellulose ether, hydroxyethyl cellulose and hydroxyethylmethyl cellulose.

The particular alkylolamine employed in the production of our medicinal preparations will vary with the type of preparation desired and with the particular sulfonamide employed. When the preparation is to be liquid in form, we prefer to use triethanolamine or diethanolamine as the alkylolamine, inasmuch as 2-sulfanilamidopyrimidine and 2 - sulfanilamidothiazole are soluble in aqueous triethanolamine or diethanolamine solutions. Semi-solid or ointment-like preparations can, however, be prepared utilizing triethanolamine or diethanolamine by simply reducing the amount of water employed or by utilizing a highly viscous type of water soluble alkyl cellulose ether. When a solid alkylolamine such as 2-amino-2-methyl 1,3-propane diol is employed a solid preparation is obtained which makes it particularly desirable for certain types of application.

It is readily seen that the basic ingredients of our medicinal preparations are an alkylolamine, a sulfonamide and a water soluble cellulose derivative. For many purposes, however, we may desire to incorporate additional ingredients and modify our preparations. For example, in the case of our liquid preparations, we may add an organic solvent which is miscible with the aqueous mixture to promote a more rapid evaporation and hence a more rapid film or eschar formation. Suitable substances for producing this result are ethyl alcohol, methyl alcohol, acetone, and the like. Where an elastic or pliable film is desired, we may add a plasticizer to our preparation including substances such as the polyhydric alcohols, sorbitol, mannitol, glycerol and the like. In order to obtain a film having slightly modified characteristics, we may add varying amounts of film forming agents such as bentonite, polyvinyl alcohol compounds, acrylate, hydrated alumina, casein or glue and the use of such cooperating substances is not precluded from the scope of the invention.

Non-toxic preservatives may also be added to prevent decomposition, if necessary. For example, thiourea, phenylthiourea, N-ethylthiourea, S-ethylpseudothiourea, or N,N-diethylthiourea may be added as a preservative to prevent oxidation. In order to obtain a preparation having improved spreading and penetrating powers, a wetting agent may be added. The sodium salt of the dioctyl ester of sulfosuccinic acid is a wetting agent which we have found to be particularly effective in this respect. Instead, thereof, it is to be clearly understood, however, that any non-toxic, non-irritating detergent or wetting agent of either the anionic or cationic type may be employed. Among the anionic type are diesters of sulfosuccinic acid, alkyl aryl sulfonates, fatty acid soaps of alkylalanines, fatty alcohol sulfates, sulfonated fatty alcohols, sulfates of mixed fatty acid glycerides, etc., described as commercially available surface active agents on pages 16-22 of the January 1941 issue of "Industrial and Engineering Chemistry." Among the cationic types are the alkylpyridinium and quaternary ammonium halide, the higher aliphatic amines, reaction products of higher fatty acids with polyalkylene polyamines, etc.

We can include local antiseptic or bacteriostatic agent other than a sulfonamide, as an example, cetyl pyridinium chloride, an alkyl ($C_9$–$C_{14}$) dimethylbenzylammonium chloride, para-tertiary octyl phenyldiethoxydimethylbenzylammonium chloride, an alkyl phenol or resorcinol derivative, etc. A tissue growth promoter or granulating agent. As an example, urea or allantoin. A local anesthetic. As an example, salicyl alcohol or gamma-(2-methyl-piperidine)-propyl benzoate hydrochloride. Medicinal dyes for coloring or antiseptic action. As an example, acriflavine hydrochloride, 3,6,diaminoacridinium monohydrogen sulfate, triple dye (gentian violet 2%; brilliant green 1%; neutral acriflavine 0.1%) and the like. Substances for modifying the solubility properties and increasing elastic properties. For example, castor oil, cod liver oil as such or in the form of soap or mixtures of oil and soap and the like.

We claim:

1. A film-forming medicinal preparation for topical application to form a tough, pliable, elastic, and protective film in situ comprising 1.5 to 10% by weight of a sulfa drug, 4 to 30% by weight of triethanolamine, 2½ to 6.5% by weight of methyl cellulose, and water, said composition having a viscosity between 5 and 95 poises.

2. A film-forming medicinal preparation for topical application to form a tough, pliable, elastic, and protective film in situ comprising 1.5 to 10% by weight of 2-sulfanilamidopyrimidine, 4 to 30% by weight of triethanolamine, 2½ to 6.5% by weight of methyl cellulose, and water, said composition having a viscosity between 5 and 95 poises.

3. A film-forming medicinal preparation for topical application to form a tough, pliable, elastic, and protective film in situ comprising 1.5 to 10% by weight of 2-sulfanilamidothiazole, 4 to 30% by weight of triethanolamine, 2½ to 6.5% by weight of methyl cellulose, and water, said composition having a viscosity between 5 and 95 poises.

JAMES KENNETH DIXON.
RUSSELL L. MORGAN.

REFERENCES CITED

The following references are of record in the file of this patent:

UNITED STATES PATENTS

| Number | Name | Date |
| --- | --- | --- |
| 2,361,624 | Hamilton et al. | Oct. 31, 1944 |

OTHER REFERENCES

"Sulfadiazene Treatment of Burns," Adams et al., Southern Surgeon, May 1942, starting at page 324, abstracted in J. A. M. A., Aug. 15, 1942, pg. 1384.

"A Sulfonamide Film . . ." Pickrell-Bull., Johns Hopkins Hosp., Nov. 1942, pgs. 304-6.

Surgery, Gynecology and Obstetrics, International Abstract of Surgery, Oct. 1942, page 393.

Journal of the American Pharmaceutical Assoc., Scientific Edition, April 1942, page 107.

Journal of the Amer. Medical Assoc., Oct. 25, 1941, page 1468.

American Journal of Pharmacy, Dec. 1939, pages 476 and 477. (Copies in 167-63S.) J. A. M. A., page 1926, Nov. 29, 1941.